(12) United States Patent
Kato

(10) Patent No.: US 6,268,870 B1
(45) Date of Patent: Jul. 31, 2001

(54) IMAGE DISPLAY METHOD, IMAGE DISPLAY APPARATUS AND IMAGED-BASED DIAGNOSTIC APPARATUS

(75) Inventor: Kanta Kato, Tokyo (JP)

(73) Assignee: GE Yokogawa Medical Systems, Limited, Tokyo (JP)

( * ) Notice: Subject to any disclaimer, the term of this patent is extended or adjusted under 35 U.S.C. 154(b) by 0 days.

(21) Appl. No.: 09/141,609

(22) Filed: Aug. 28, 1998

(30) Foreign Application Priority Data

Sep. 1, 1997 (JP) .................................................. 9-235565

(51) Int. Cl.$^7$ ............................... G06T 3/40; G09G 5/06; H04N 1/387
(52) U.S. Cl. ........................... 345/439; 345/199; 358/452
(58) Field of Search ..................................... 345/112, 507, 345/199, 432, 439; 382/180, 274, 132, 162, 54, 131, 260, 199, 264; 395/166; 358/452, 456, 447

(56) References Cited

U.S. PATENT DOCUMENTS

| | | | |
|---|---|---|---|
| 4,941,190 | * 7/1990 | Joyce ..................................... | 382/54 |
| 5,058,176 | 10/1991 | Shimazaki . | |
| 5,261,050 | * 11/1993 | Fox et al. .............................. | 395/166 |
| 5,363,212 | * 11/1994 | Taniuchi et al. ...................... | 358/452 |
| 5,809,164 | * 9/1998 | Hultgren ............................... | 382/162 |

FOREIGN PATENT DOCUMENTS

| | | |
|---|---|---|
| 0632406 | 1/1995 | (EP) . |
| 8007074 | 12/1996 | (JP) . |
| 9210800 | 6/1992 | (WO) . |

\* cited by examiner

*Primary Examiner*—Mark R. Powell
*Assistant Examiner*—Chantè E. Harrison
(74) *Attorney, Agent, or Firm*—Moonray Kojima (57) ABSTRACT

With the intention of making the image display swiftly responsive to the operator's action of altering the window level and/or window width, the contents of the image pixel data to display data conversion table are revised only in its range from a start point α to an end point β calculated as follows, instead of the revision of the entire contents of conversion table:

$$\alpha = \max\{Rmin, \min(WL1-WW1/2, WL2-WW2/2)\}$$

$$\beta = \min\{Rmax, \max(WL1+WW1/2, WL2+WW2/2)\}$$

where max{ } is the function of selecting the maximum value, min{ } is the function of selecting the minimum value, Rmin is the lower limit of the revision range, Rmax is the upper limit of the revision range, WL1 is an original window level, WW1 is an original window width, WL2 is a new window level, and WW2 is a new window width.

3 Claims, 7 Drawing Sheets

| PIXEL VALUE | DISPLAY VALUE |
|---|---|
| -32,768 | 0 |
| -32,767 | 0 |
| -32,766 | 0 |
| ... | ... |
| -1 | ... |
| 0 | 134 |
| 1 | 135 |
| ... | 136 |
| ... | ... |
| 32,766 | ... |
| 32,767 | 255 |
| 32,768 | 255 |
|  | 255 |

LUT 3

IMAGE DISPLAY METHOD, IMAGE DISPLAY APPARATUS AND IMAGED-BASED DIAGNOSTIC APPARATUS

BACKGROUND OF THE INVENTION

The present invention relates to an image display method, image display apparatus and image-based diagnostic apparatus. More particularly, the invention relates to an image display method, image display apparatus and image-based diagnostic apparatus capable of making the image display swiftly responsive to the operator's action of altering the window level and/or window width.

Figure 7:
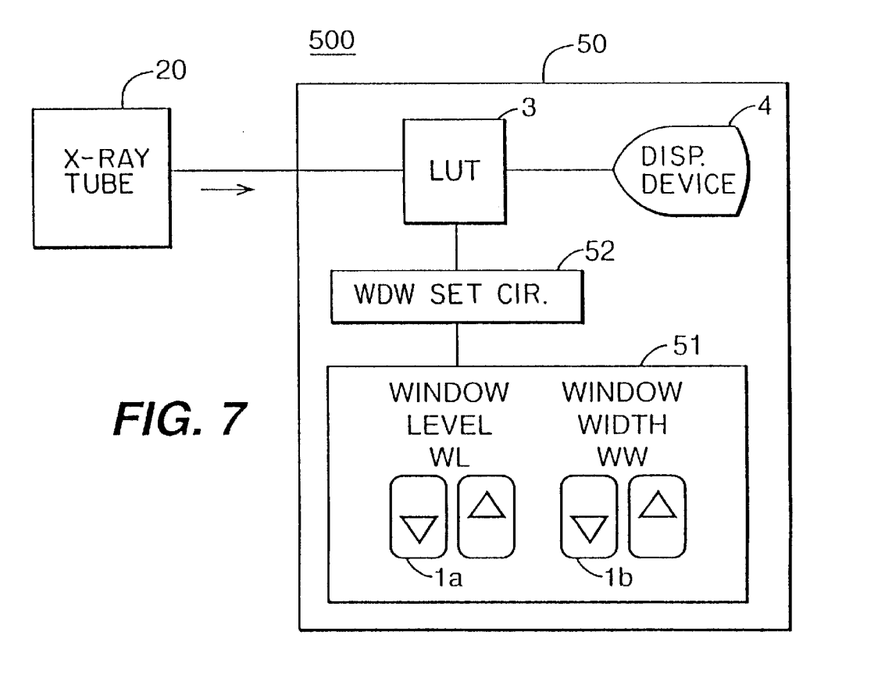
FIG. 7 is a block diagram showing the principal portion of a conventional image-based diagnostic apparatus.

FIG. 7 is a block diagram showing the principal portion of a conventional image-based diagnostic apparatus. The image-based diagnostic apparatus 500 consists of an X-ray TV 20 which produces an X-ray transparency image of a subject body and evaluates pixels of the image, and an image display apparatus 50 which displays an image based on the values of pixels.

The image display apparatus 50 includes an operation panel 51 used by the operator, with window level alteration keys 1a for altering the window level WL and window width alteration keys 1b for altering the window width WW being laid out, a window setting circuit 52 which initializes a lookup table (LUT) 3 based on the default window level WL0 and default window width WW0 and also revises the entire contents of LUT 3 in accordance with an immediate window level WL and window width WW inresponse to the operation of a window level alteration key la and/or window width alteration key 1b, the LUT 3 which converts pixel values of an X-ray transparency image into values for display, and a display device 4 such as a CRT display device.

Figure 8A:
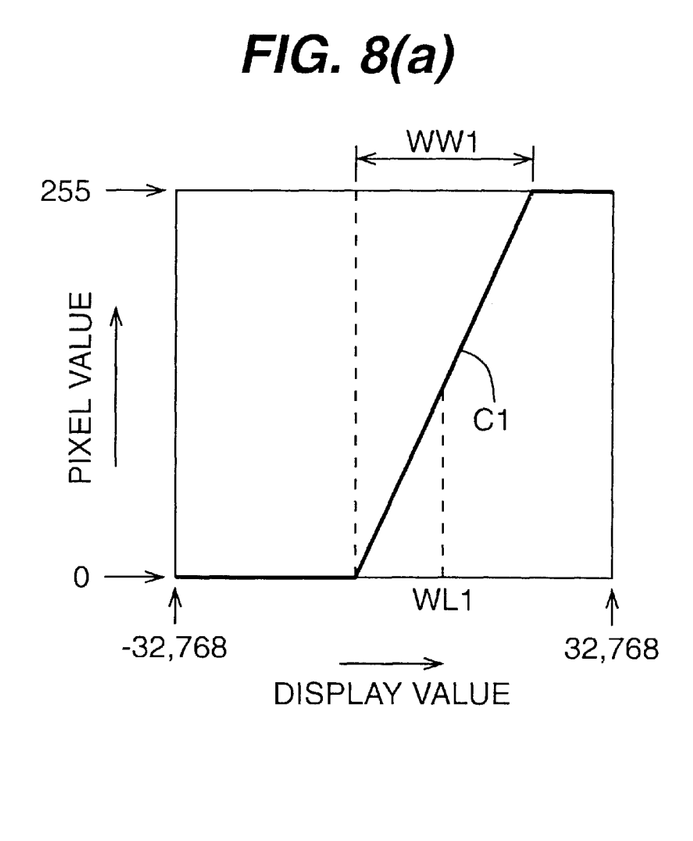
FIGS. 8A and 8B are a graph and table used to explain an original window and lookup table relevant to the conventional apparatus.
Figure 8B:
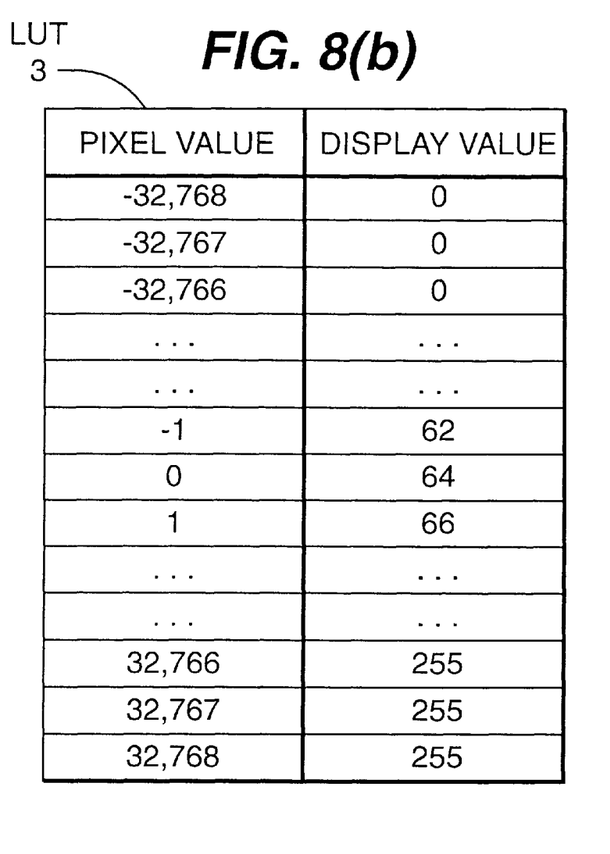

FIG. 8A shows window C1 having window level WL1 and window width WW1, and FIG. 8B shows the contents of LUT 3 for the window C1.

This LUT 3 converts pixel values ranging from "−32768" to "32768" into display values ranging from "0 (black)" to "255 (white)".

In FIG. 8A, the window level WL1 indicates the center pixel value of the range of pixel values to be converted into display values of "1" to "254" between the minimum display value "0" and the maximum display value "255". The window width WW1 indicates the width of the conversion range.

Figure 9A:
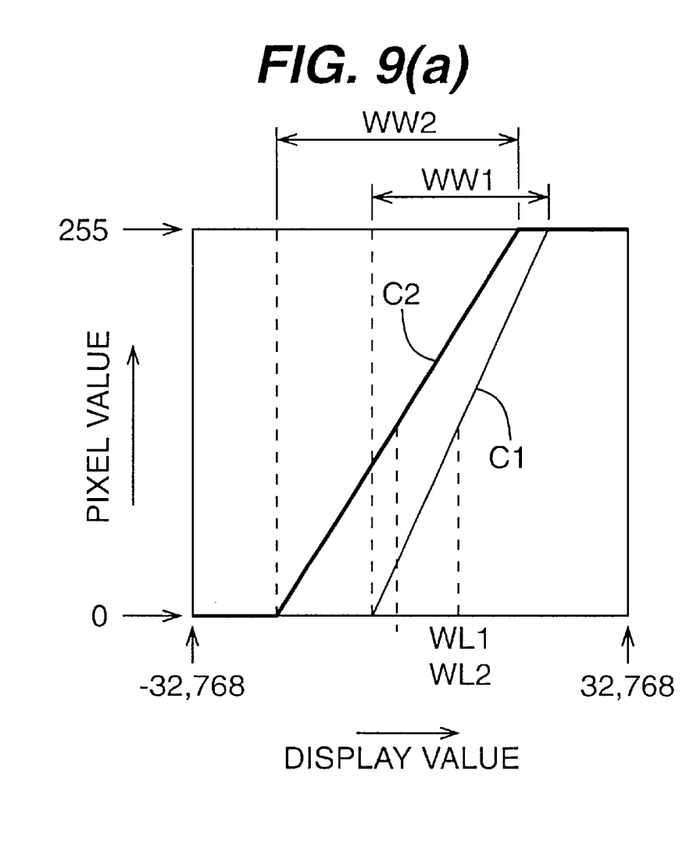
FIGS. 9A and 9B are a graph and table used to explain a new window and lookup table relevant to the conventional apparatus.
Figure 9B:
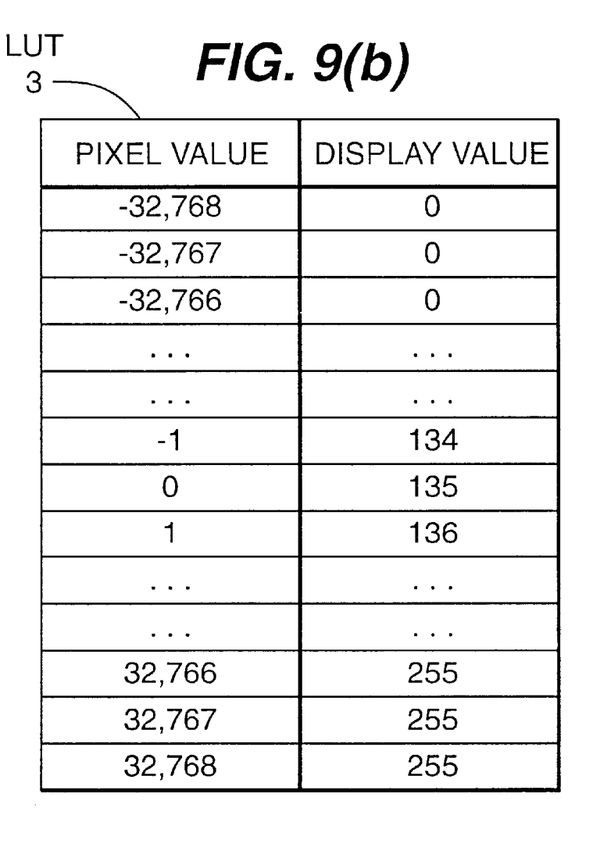

In FIG. 9A, when the operator operates a window level alteration key 1a and window width alteration key 1b to alter the window level from WL1 to WL2 and alter the window width from WW1 to WW2, the window setting circuit 52 revises the entire contents of LUT 3 in accordance with the new window level WL2 and window width WW2. FIG. 9B show the contents of LUT 3 for window C2.

The foregoing conventional technique is disclosed in Japanese Patent Laid-open Publication No. Hei-8-7074, for example.

As described above, the conventional image display apparatus 50 or image-based diagnostic apparatus 500 is designed to revise the entire contents of LUT 3 in response to the operator's action of altering the window level and/or window width.

However, it takes a long time for the LUT 3 to revise 65536 pieces of data, and therefore the image display cannot respond swiftly to the alteration of the window level and/or window width.

SUMMARY OF THE INVENTION

An object of the present invention is to provide an image display method, image display apparatus and image-based diagnostic apparatus capable of making the image display swiftly responsive to the operator's action of altering the window level and/or window width.

In the first viewpoint, the invention resides in an image display method for displaying an image on a screen by converting values of pixels into values for display based on a conversion table, wherein in revising the contents of conversion table in response to the operator's action of altering at least one of the window level which indicates the center pixel value of the range of pixel values to be converted into display values between the minimum display value and the maximum display value and the window width which indicates the width of the conversion range, the conversion table is revised only in the range from a start point α to an end point β calculated as follows, instead of the revision of the entire contents of conversion table:

$$\alpha = \max\{\text{Rmin}, \min(\text{WL1}-\text{WW1}/2, \text{WL2}-\text{WW2}/2)\} \quad (1)$$

$$\beta = \min\{\text{Rmax}, \max(\text{WL1}+\text{WW1}/2, \text{WL2}+\text{WW2}/2)\} \quad (2)$$

where max{ } is the function of selecting the maximum value, min{ } is the function of selecting the minimum value, Rmin is the lower limit of the revision range, Rmax is the upper limit of the revision range, WL1 is an original window level, WW1 is an original window width, WL2 is a new window level, and WW2 is a new window width.

In the image display method of the first viewpoint, the conversion table is revised only in its revision range from the start point α to the end point β, instead of the entirety. Generally, the smallest pixel value appearing in an image is larger than the minimum pixel value in the LUT and the largest pixel value of the image is smaller than the maximum pixel value of the LUT, and therefore there arises no problem practically when the smallest pixel value of the image is set to the lower limit Rmin of revision range and the largest pixel value of the image is set to the upper limit Rmax of revision range. Consequently, the revision range of LUT is narrowed significantly to the range from the lower limit Rmin to the upper limit Rmax at most. (It will be narrowed much more depending on the values of WL1, WW1, WL2 and WW2.) Accordingly, the time expended for revising the LUT can be reduced significantly, and it becomes possible to make the image display swiftly responsive to the alteration of window level and/or window width.

In the second viewpoint, the invention resides in an image display apparatus for displaying an image on a screen by converting values of pixels into values for display based on a conversion table, wherein the apparatus includes an operation means which is used by the operator for altering at least one of the window level which indicates the center pixel value of the range of pixel values to be converted into display values between the minimum display value and maximum display value and the window width which indicates the width of the conversion range, and a window setting means which revises the contents of conversion table only in its range from a start point α to an end point β calculated as follows, instead of the revision of the entire contents of conversion table, in response to the operator's action of altering the window-level and/or window width:

$$\alpha = \max\{\text{Rmin}, \min(\text{WL1}-\text{WW1}/2, \text{WL2}-\text{WW2}/2)\}$$

$$\beta = \min\{\text{Rmax}, \max(\text{WL1}+\text{WW1}/2, \text{WL2}+\text{WW2}/2)\}$$

where max{ } is the function of selecting the maximum value, min{ } is the function of selecting the minimum value, Rmin is the lower limit of the revision range, Rmax is the upper limit of the revision range, WL1 is an original window level, WW1 is an original window width, WL2 is a new window level, and WW2 is a new window width.

The image display apparatus of the second viewpoint can carry out the image display method of the first viewpoint properly.

In the third viewpoint, the invention resides in an image-based diagnostic apparatus which produces an image of a subject body and converts values of pixels of the image into values for display based on a conversion table and displays the image on a screen, wherein the apparatus includes an operation means which is used by the operator for altering at least one of the window level which indicates the center pixel value of the range of pixel values to be converted into display values between the minimum display value and maximum display value and the window width which indicates the width of the conversion range, and a window setting means which revises the contents of conversion table only in its range from a start point $\alpha$ to an end point $\beta$ calculated as follows, instead of the revision of the entire contents of conversion table, in response to the operator's action of altering the window level and/or window width:

$$\alpha=\max\{Rmin, \min(WL1-WW1/2, WL2-WW2/2)\}$$

$$\beta=\min\{Rmax, \max(WL1+WW1/2, WL2+WW2/2)\}$$

where max{ } is the function of selecting the maximum value, min{ } is the function of selecting the minimum value, Rmin is the lower limit of the revision range, Rmax is the upper limit of the revision range, WL1 is an original window level, WW1 is an original window width, WL2 is a new window level, and WW2 is a new window width.

The image-based diagnostic apparatus of the third viewpoint can carry out the image display method of the first viewpoint properly.

According to the inventive image display method, image display apparatus and image-based diagnostic apparatus, the quantity of data to be revised can be reduced significantly in contrast to the case of revising the entire contents of conversion table. Consequently, the time expended for revising the contents of conversion table can be reduced significantly, and it becomes possible to make the image display swiftly responsive to the alteration of window level and/or window width.

Further objects and advantages of the present invention will become apparent from the following description of the preferred embodiments of the invention as illustrated in the accompanying drawings.

DESCRIPTION OF THE PREFERRED EMBODIMENTS

The invention will be explained in more detail in connection with the following illustrated embodiments.

Figure 1:
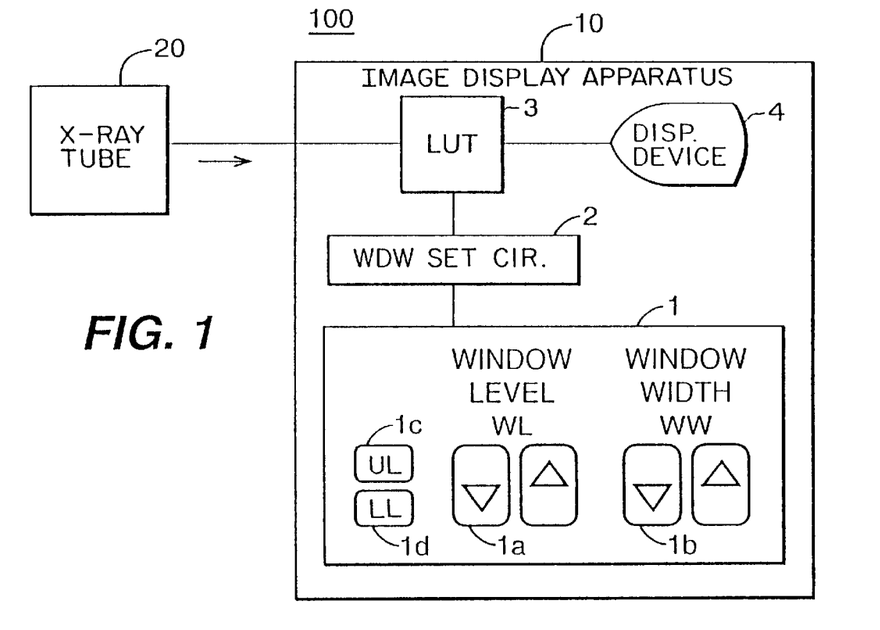
FIG. 1 is a block diagram showing the principal portion of the image-based diagnostic apparatus based on an embodiment of this invention.

FIG. 1 shows by block diagram the image-based diagnostic apparatus based on an embodiment of this invention. The image-based diagnostic apparatus 100 consists of an X-ray TV 20 which produces an X-ray transparency image of a subject body and evaluates pixels of the image, and an image display apparatus 10 which displays an image based on the values of pixels.

The image display apparatus 10 includes an operation panel 1 used by the operator, with window level alteration keys 1a for altering the window level WL, window width alteration keys 1b for altering the window width WW, an upper limit key 1c for setting the upper limit of input pixel value, and a lower limit key 1d for setting the lower limit of input pixel value being laid out, a window setting circuit 2 which initializes a lookup table (LUT) 3 to the default window level WL0 and default window width WW0 and also revises only a necessary portion of the contents of LUT 3 in accordance with an immediate window level WL and window width WW in response to the operation of the window level alteration key 1a and/or window width alteration key 1b, the LUT 3 which converts values of pixels of an X-ray transparency image into values for display, and a display device 4 such as a CRT display device.

Figure 2:
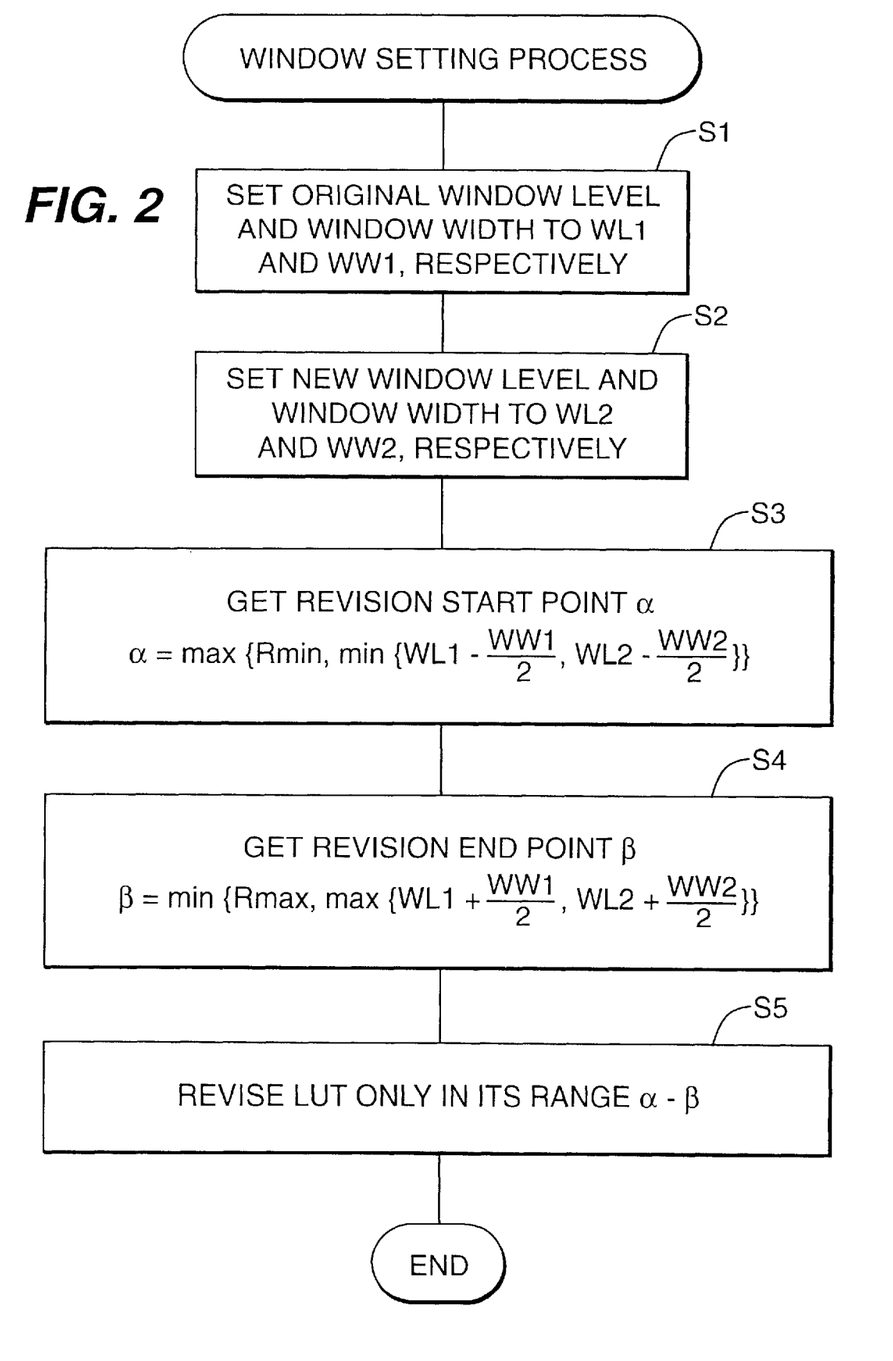
FIG. 2 is a flowchart showing the window setting process implemented by the apparatus shown in FIG. 1.

FIG. 2 shows by flowchart the processing implemented by the window setting circuit 2.

Figure 3A:
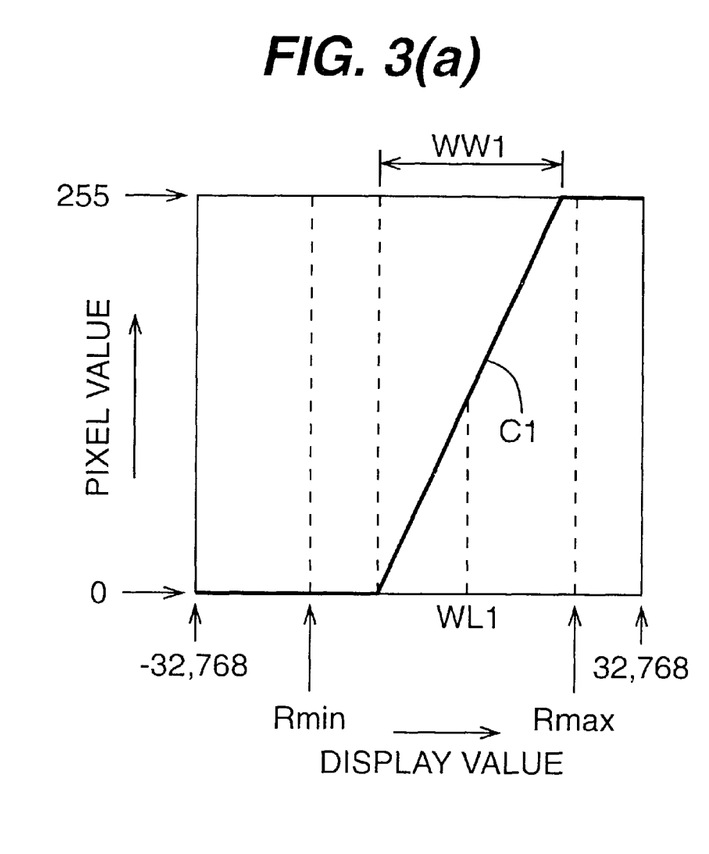
FIGS. 3A and 3B are a graph and table used to explain an original window and lookup table.
Figure 3B:
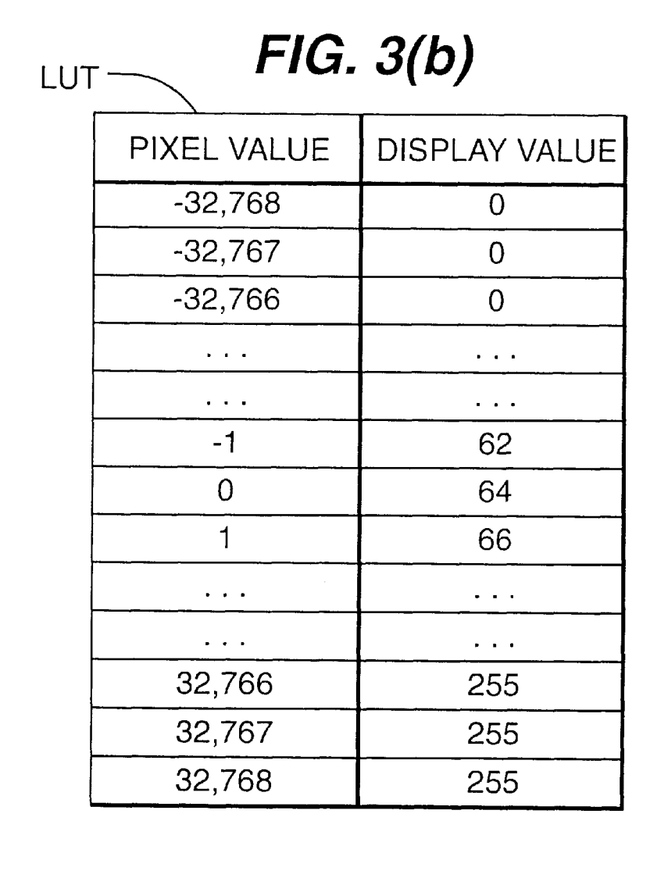

Step S1 sets the original window level and window width to WL1 and WW1, respectively, as shown in FIG. 3A. The image display apparatus 10 has a preset lower limit Rmin of pixel value, e.g., "−1500", and a preset upper limit Rmax of pixel value, e.g., "4000", as shown in FIG. 3A. FIG. 3B shows the centers of LUT 3 for window C2.

Figure 4:
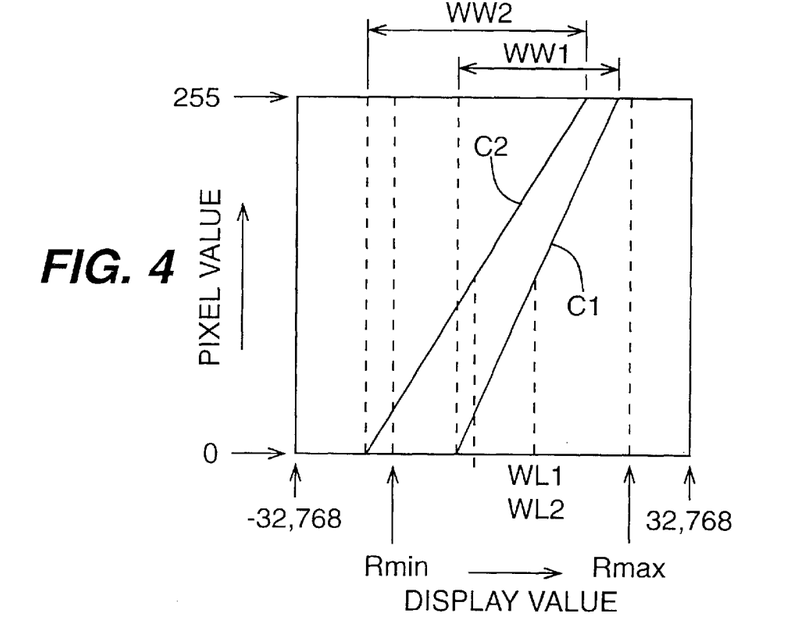
FIG. 4 is a graph used to explain a new window.

Step S2 sets the new window level and window width to WL2 and WW2, respectively, as shown in FIG. 4.

Step S3 calculates the revision start point $\alpha$ as follows.

$$\alpha=\max\{Rmin, \min(WL1-WW1/2, WL2-WW2/2)\}$$

where max{ } is the function of selecting the maximum value, and min{ } is the function of selecting the minimum value.

Figure 5:
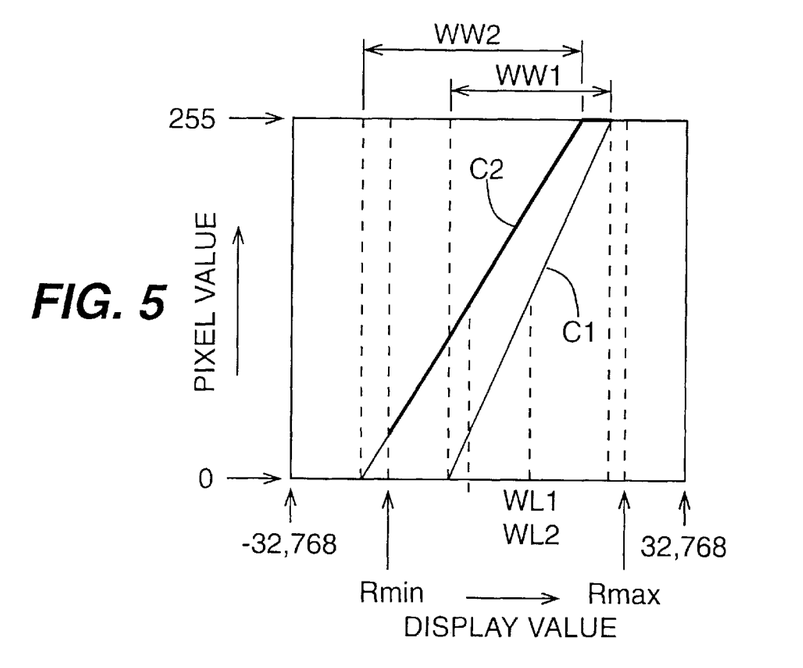
FIG. 5 is a graph used to explain the revision range of the lookup table.

As shown in FIG. 5, the value WL1−WW1/2 is of the point at which the display value of the window C1 rises from "0" and the value WL2−WW2/2 is of the point at which the display value of the window C2 rises from "0", with the former being the smallest value. However, the lower limit Rmin is greater than WL2−WW2/2, and therefore the revision start point $\alpha$ is set to the lower limit Rmin.

Step S4 calculates the revision end point $\beta$ as follows.

$$\beta=\min\{Rmax, \max(WL1+WW1/2, WL2+WW2/2)\} \quad (2)$$

As shown in FIG. 5, the value WL1+WW1/2 is of the point at which the display value of the window C1 reaches "255" and the value WL2+WW2/2 is of the point at which the display value of the window C2 reaches "255", with the former being the smallest value. Since WL2−WW2/2 is smaller than the upper limit Rmax, the revision end point $\beta$ is set to the point at which the display value of the window C2 reaches "255".

Step S5 revises the contents of LUT 3 only in its range from the start point α to the end point β (shown by the bold line in FIG. 5).

Figure 6A:
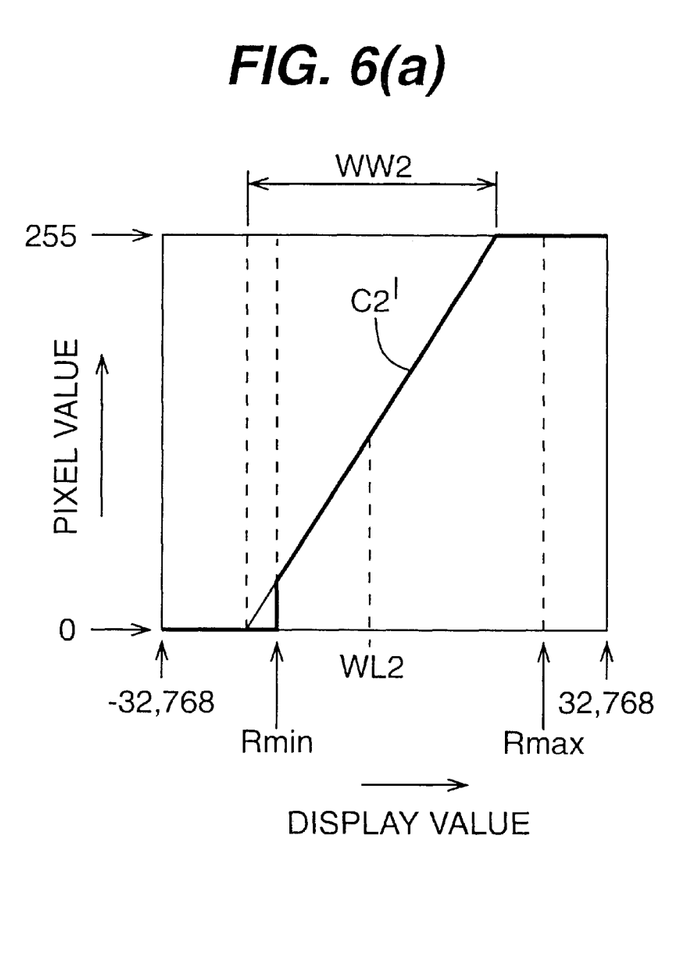
FIGS. 6A and 6B are a graph and table used to explain a new window and lookup table.
Figure 6B:
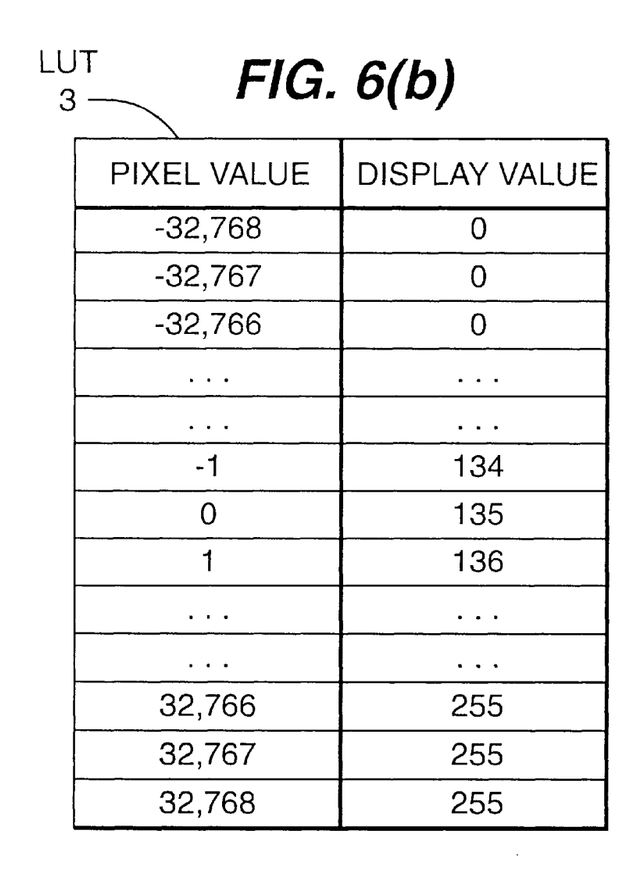

As a result of the process, the contents of LUT 3 are revised as shown by window C2' of the bold line in FIG. 6A. Although the window C2' differs from the intended window C2 in the portion where pixel values are smaller than the lower limit Rmin, input pixel values are never smaller than the lower limit Rmin (Rmin and Rmax are preset to cover all possible input pixel values), and therefore no problem arises. Image annotations and figures are imprinted in the image by being provided with a pixel value of "−32768" or "32768", and therefore they are not affected by the alteration of window. FIG. 6B show the content of LUT 3 for window C2.

According to the image display apparatus 10 or image-based diagnostic apparatus 100, the revision range of LUT is narrowed significantly to the range from the lower limit Rmin to the upper limit Rmax at most. Accordingly, the time expended for revising the LUT can be reduced significantly, and it becomes possible to make the image display swiftly responsive to the alteration of window level and/or window width.

The lower limit Rmin and upper limit Rmax may be set automatically depending on the kind of image, so that these values are altered automatically in response to the switching from images of the X-ray CT apparatus to images of the MRI apparatus, for example.

Many widely different embodiments of the invention may be constructed without departing from the spirit and the scope of the present invention. It should be understood that the present invention is not limited to the specific embodiments described in the specification, except as defined in the appended claims.

What is claimed is:

1. An image display method for displaying an image on a screen by converting values of pixels into values for display based on a conversion table, wherein in revising contents of conversion table in response to an operator's action of altering at least one of a window level which indicates a center pixel value of a range of pixel values to be converted into display values between the minimum display value and the maximum display value and a window width which indicates the width of the conversion range, the conversion table is revised only in a range from a start point α to an end point β calculated as follows, instead of the revision of entire contents of conversion table:

$$\alpha = \max\{R\min, \min(WL1-WW1/2, WL2-WW2/2)\} \quad (1)$$

$$\beta = \min\{R\max, \max(WL1+WW1/2, WL2+WW2/2)\} \quad (2)$$

where max{ } is the function of selecting the maximum value, min{ } is the function of selecting the minimum value, Rmin is the lower limit of the revision range, Rmax is the upper limit of the revision range, WL1 is an original window level, WW1 is an original window width, WL2 is a new window level, and WW2 is a new window width.

2. An image display apparatus for displaying an image on a screen by converting values of pixels into values for display based on a conversion table, comprising:

operation means which is used by an operator for altering at least one of a window level which indicates a center pixel value of a range of pixel values to be converted into display values between the minimum display value and maximum display value and a window width which indicates a width of the conversion range; and window setting means which revises contents of conversion table only in its range from a start point α to an end point β calculated as follows, instead of revision of entire contents of conversion table, in response to the operator's action of altering the window level and/or window width:

$$\alpha = \max\{R\min, \min(WL1-WW1/2, WL2-WW2/2)\}$$

$$\beta = \min\{R\max, \max(WL1+WW1/2, WL2+WW2/2)\}$$

where max{ } is the function of selecting the maximum value, min{ } is the function of selecting the minimum value, Rmin is the lower limit of the revision range, Rmax is the upper limit of the revision range, WL1 is an original window level, WW1 is an original window width, WL2 is a new window level, and WW2 is a new window width.

3. An image-based diagnostic apparatus which produces an image of a subject body and converts values of pixels of the image into values for display based on a conversion table and displays the image on a screen, comprising:

operation means which is used by an operator for altering at least one of a window level which indicates a center pixel value of a range of pixel values to be converted into display values between the minimum display value and maximum display value and a window width which indicates a width of the conversion range; and a window setting means which revises contents of conversion table only in its range from a start point α to an end point β calculated as follows, instead of revision of entire contents of conversion table, in response to the operator's action of altering the window level and/or window width:

$$\alpha = \max\{R\min, \min(WL1-WW1/2, WL2-WW2/2)\}$$

$$\beta = \min\{R\max, \max(WL1+WW1/2, WL2+WW2/2)\}$$

where max{ } is the function of selecting the maximum value, min{ } is the function of selecting the minimum value, Rmin is the lower limit of the revision range, Rmax is the upper limit of the revision range, WL1 is an original window level, WW1 is an original window width, WL2 is a new window level, and WW2 is a new window width.

* * * * *